United States Patent

[11] 3,588,824

[72] Inventor William M. Barker
Scottsville, N.Y.
[21] Appl. No. 855,163
[22] Filed Sept. 4, 1969
[45] Patented June 28, 1971
[73] Assignee General Signal Corporation
Rochester, N.Y.

[54] SPARE CHANNEL SYSTEM FOR SECTIONALIZING A COMMUNICATION LINE CIRCUIT

7 Claims, 2 Drawing Figs.

[52] U.S. Cl. 340/163, 340/147
[51] Int. Cl. H04q 5/00, H04q 9/00
[50] Field of Search 340/147 (SC), 163

[56] References Cited

UNITED STATES PATENTS 2,330,241 9/1943 Roberts 340/147(SC)

*Primary Examiner*—Harold I. Pitts
*Attorneys*—Jeremiah J. Duggan and Harold S. Wynn

ABSTRACT: A communication line circuit connects a control office station with a plurality of successive remotely spaced field stations. An auxiliary line circuit extends from the control office to the most remote field station. The communication line circuit is normally energized, and a line detector relay at each station senses such energization. In case of line circuit failure, the dropping away of the detector relays at various stations activates sectionalizing means and indicators at the control office manifest the general area of the failure. Controls for desectionalization can be transmitted from the control office to the several field stations to put the line circuit back together station-by-station as desired to communicate with field stations ahead of the failure directly from the control office over the communication line circuit and to communicate with field stations beyond the failure through the section of the communication line circuit beyond the failure and over the auxiliary line circuit to the control office.

Patented June 28, 1971

3,588,824

2 Sheets-Sheet 1

Patented June 28, 1971 3,588,824

2 Sheets-Sheet 2

SPARE CHANNEL SYSTEM FOR SECTIONALIZING A COMMUNICATION LINE CIRCUIT

Figure 1A:
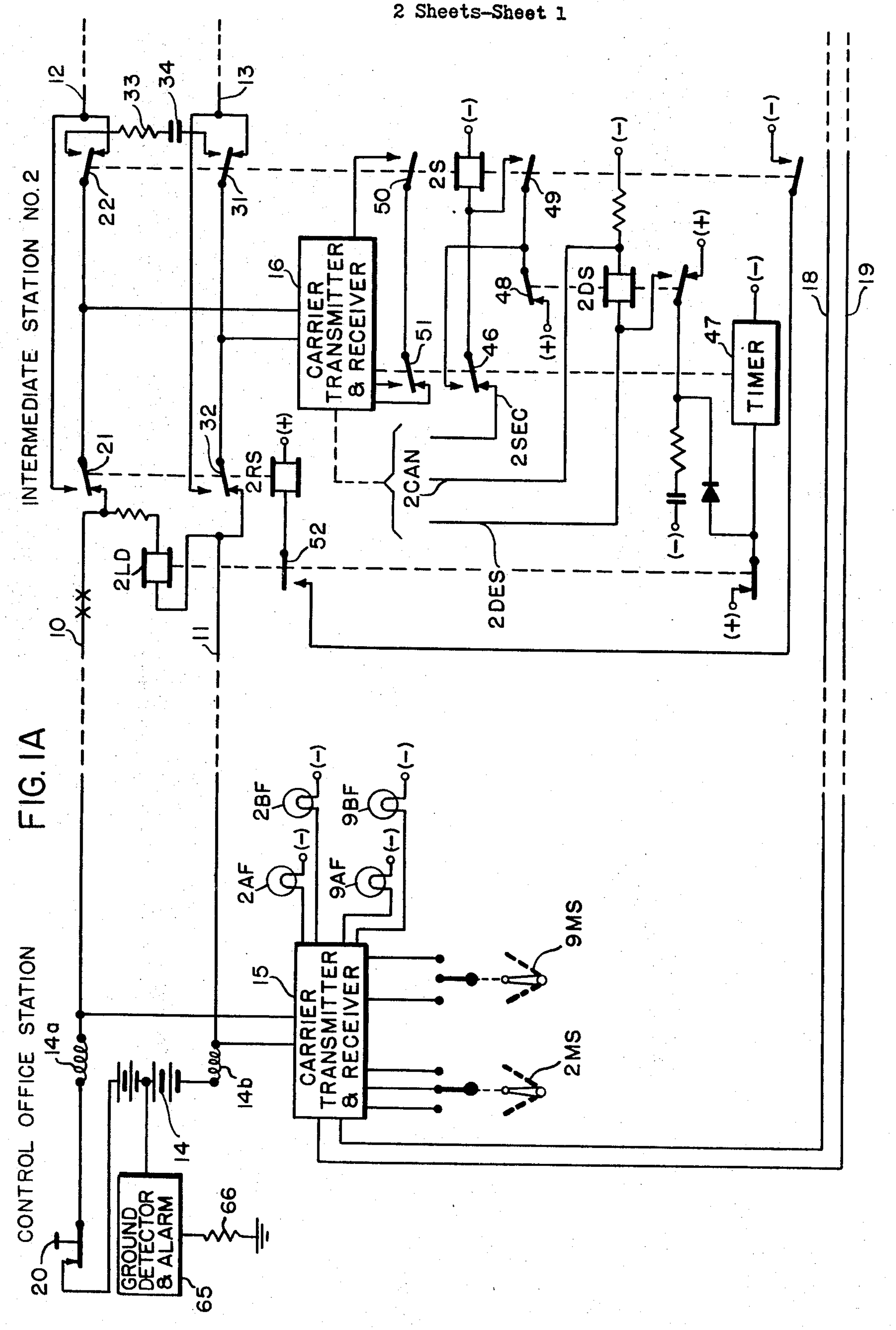

While this invention is subject to a wide range of applications, it is especially suited for sectionalization of a communication line circuit in a multiple station code communication system, and it will particularly described in this connection.

Code communication systems are widely used for centralized traffic control on railroads wherein a communication line circuit connects a control office station with a plurality of successive remote field stations. Two-way communication is generally provided wherein an operator at the control office station is kept posted by indication code transmitted from the field stations as to occupancy of the trackway, and the condition of track switches and signals, and wherein the operator can transmit control codes for the selective control of the track switches and signals at the field stations. Line circuit failure by grounding, shorting or by open-circuit of the line wires can render such a communication system substantially inoperable until the trouble is repaired unless a system of sectionalizing is used to isolate the part of the line circuit where the failure has occurred, and thus allow normal operation of part of the system.

An object of the present invention is to provide an improved system for sectionalizing a communication line circuit upon line circuit failure in a code communication system for multiple stations.

SUMMARY OF INVENTION

A system is provided for sectionalizing a communication line circuit connecting a control office station with a plurality of successive remotely spaced field stations. The communication line circuit is normally energized from the control office, and means is provided at each field station for sensing the continued energization of the communication line circuit. Sectionalizing means at each field station is rendered active upon the deenergization of the sensing means at that station to open the line circuit at the associated station. Desectionalizing means is provided at each station and adapted to be activated from the control office by code communication for facilitating putting the various sections of a sectionalized line circuit back together again. Carrier code communication means partly at the control office station and partly at the several field stations provides for the communication of desectionalization control codes from the control office to the several field stations. This communication system is also used to communicate indication code as to the condition of the sectionalizing means from the several field stations to the control office station. An auxiliary line circuit connects the control office station to the most remote field station as a standby circuit to be used in case of sectionalization wherein the office can communicate under line failure conditions with the greatest number of field stations by transmitting through both ends of the communication line circuit. The auxiliary line circuit is normally disconnected from the communication line circuit, but is connected at the most remote station in accordance with the condition of the sensing means at the associated station.

For a better understanding of the present invention, together with other and further objects thereof, reference is had to the following description, taken in connection with the accompanying drawings, while its scope will be pointed out in the appending claims.

Figure 1B:
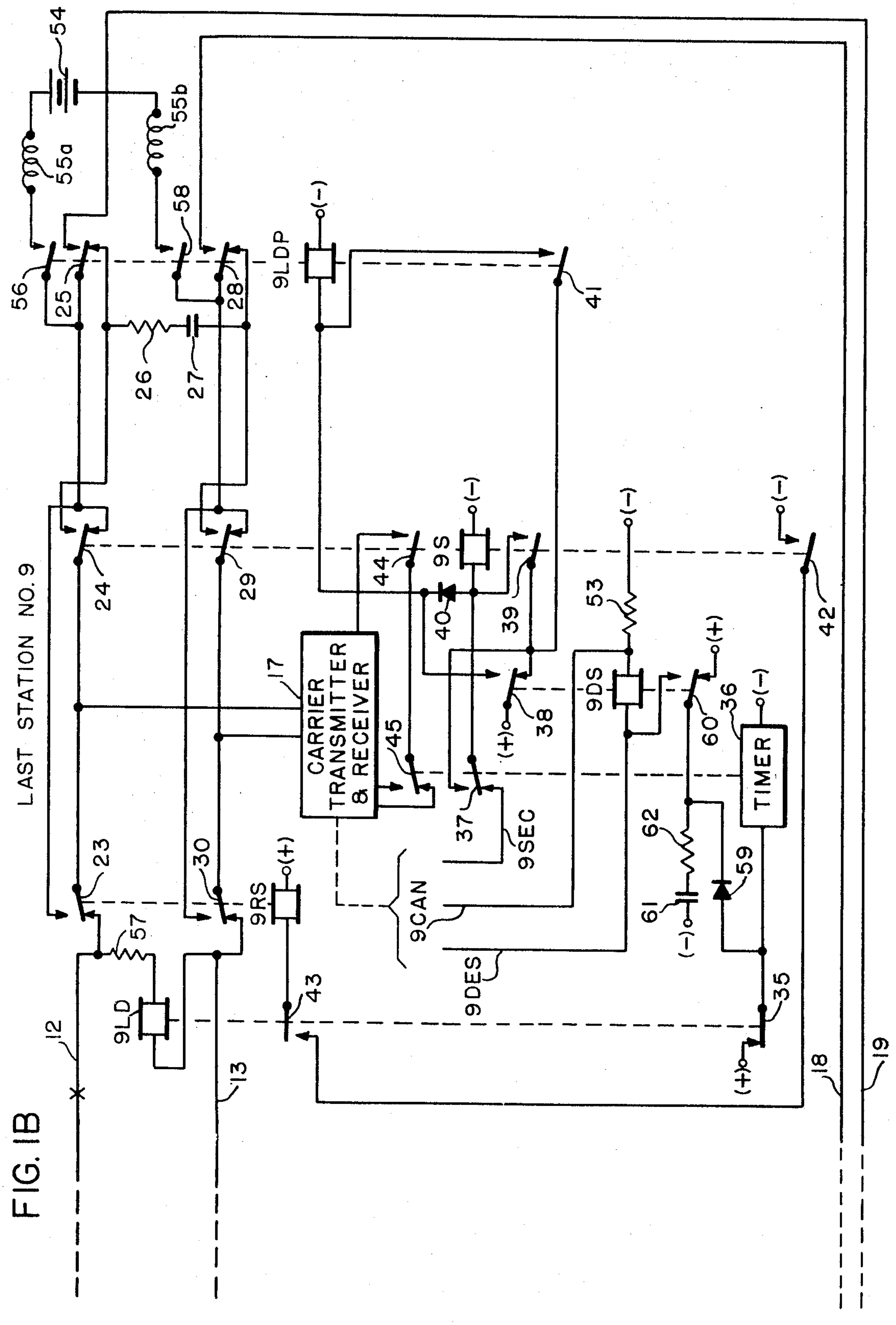

FIGS. 1A and 1B, in the accompanying drawings, when placed side by side illustrate a system for sectionalizing a communication line circuit connecting a control office station and a plurality of successive remotely spaced field stations according to a preferred embodiment of the present invention.

With reference to FIGS. 1A and 1B, a communication line circuit extends from a control office station, including wires 10 and 11 through field stations successively such as intermediate station No. 2 and through wires 12 and 13 which are shown dotted to indicate the possible inclusion of other stations, to a last station No. 9. This circuit is normally energized by battery 14 at the control office station.

A line detector relay LD is provided at each station for continuously sensing the energization of the communication line circuit. Thus the relay 2LD, for example, is connected across the communication line circuit wires 10 and 11 at the typical intermediate station No. 2 to sense its energization from the battery 14. Similarly relay 9LD at the most remote station is provided for sensing energization of the communication line circuit wires 12 and 13.

Sectionalizing means is provided at each station comprising a sectionalizing relay S and a reverse sectionalizing relay RS. Thus relays 2S and 2RS are provided for sectionalizing and reverse sectionalizing respectively at intermediate station No. 2. The sectionalizing means is activated in response to the sensing means including the relay LD at the associated station.

Desectionalizing means is provided at each station for putting the line circuit back together after sectionalization has been rendered effective. This means includes a desectionalization relay DS, such as the relay 2DS provided at intermediate station NO. 2.

Carrier code communication means is provided partly at the control office station and partly at the several field stations for communicating control codes for the desectionalizing means and for communicating indication code as to the conditions of the sectionalizing means from the several field stations to the control office. The carrier code communication means comprises a carrier transmitter and receiver 15 at the control office station, a carrier transmitter and receiver 16 at station No. 2 and a carrier transmitter and receiver 17 at station No. 9. Also carrier transmitters and receivers are provided at all other intermediate field stations that may be included in the system in accordance with the requirements of practice.

An auxiliary line circuit comprising wires 18 and 19 is provided for connecting the carrier transmitter and receiver 15 of the control office station apparatus to the most remote field station No. 9 through a switching means in the form of a normally deenergized relay 9LDP. The relay 9LDP is normally in its dropped away position as illustrated in the drawings, and when in this position, there is no connection between the auxiliary line circuit and the communication line circuit.

The communication line circuit is normally terminated through back contacts of relay 9LDP. More specifically, the communication line circuit is energized from the positive terminal of battery 14 through a normally closed manual sectionalization button 20, choke winding 14*a*, wire 10, back contact 21 of relay 2RS, back contact 22 of relay 2S, wire 12, back contact 23 of relay 9RS, back contact 24 of relay 9S, back contact 25 of relay 9LDP, terminating resistor 26 and capacitor 27 connected in series, back contact 38 of relay 9LDP, back contact 29 of relay 9S, back contact 30 of relay 9RS, wire 13, back contact 31 of relay 2S, back contact 32 of relay 2RS, wire 11, and choke winding 14*b* to the negative terminal of battery 14. Means is also provided for termination of the communication line circuit at each intermediate field station in case sectionalization is rendered effective at that station. Thus the communication line circuit can be terminated by resistor 33 in series with capacitor 34 upon the closure of front contacts 22 and 31 of the sectionalizing relay 2S at intermediate station No. 2. The termination of the line circuit is preferably by an impedance substantially matching the characteristic impedance of the line.

Three position manual control switches 2MS and 9MS are provided at the control office for the manual designation of controls governing sectionalization to be transmitted from the control office station to the field stations respectively over the carrier communication apparatus. Also indicators AF and BF are provided for each station at the control office for indicating the location of a fault as being ahead of or beyond the associated station. These indicator lamps are controlled by indications communicated from the associated field stations to the control office via the carrier communication apparatus.

Having thus considered the general organization of the system, the detail circuit organization will now be further considered upon considering typical operating conditions to be encountered in practice.

To consider the mode of operation under a typical operating condition involving failure in the communication line circuit, it will be assumed that a fault occurs in the communication line circuit wherein the circuit is opened at a point X in wire 12. This removes energy from the line detector relay 9LD, and the dropping away of this relay opens a normally energized circuit at front contact 35 for a timer 36 to initiate the timer. The timer picks up its contacts at the end of a predetermined time period to effect sectionalization only if the condition exists for several seconds in order to distinguish from momentary conditions such as surges and the like. Upon the picking up of contact 37 of timer 36, a circuit is closed for the energization of the sectionalizing relay 9S through back contact 38 of relay 9DS and front contact 37 of timer 36. The picking up of this relay closes a stick circuit at front contact 39 to shunt contact 37 out of the circuit just described. Relay 9LDP is also picked up at this time through back contact 38 of relay 9DS, front contact 37 of timer 36 and diode 40. The picking up of relay 9LDP establishes a stick circuit for that relay at front contact 41 to shunt contact 37 out of the circuit just described. Reverse sectionalizing relay 9RS becomes picked up in response to the picking up of relay 9S by the energization of a circuit including front contact 42 of relay 9S and back contact 43 of relay 9LD.

Station No. 9 now has its carrier transmitter and receiver 17 connected in communication with the carrier transmitter and receiver 15 at the control office station over the auxiliary line circuit including wires 18 and 19. Wire 18 is connected to the carrier transmitter and receiver 17 through front contact 28 of relay 9LDP and front contact 30 of relay 9RS. The auxiliary line wire 19 is connected to the carrier transmitter and receiver 17 through front contact 25 of relay 9LDP and front contact 23 of relay 9RS. Line termination resistor 26 and capacitor 27 are connected across the line at this time through front contacts 24 and 29 of sectionalization relay 9S. The carrier transmitter at station No. 9 now transmits an indication to the control office station for the illumination of lamp 9BF in accordance with the closure of front contact 44 of relay 9S and front contact 45 of timer 36. This indicates to the operator at the control office station that the station No. 9 is beyond the fault in the line circuit and is in communication with the control office station via the auxiliary line circuit comprising wires 18 and 19.

Because it is considered that the failure at the point X is an open circuit rather than a short on the communication line circuit, the line detector relays LD at the intermediate stations between the point of fault and the control office will be maintained in their picked up positions, and thus there will be no automatic sectionalizing at these stations. This is indicated at the office station by the indicator lamps for these stations remaining dark because the picking up of a sectionalizing relay at the associated field station is required for the energization of these lamps.

The operator will now cause the transmission of a sectionalization control by actuation of a switch MS at the control office for the intermediate station adjoining the fault so as to cause the line circuit to be terminated at that station. If this is assumed to be the intermediate station No. 2 that is illustrated, such a control causes energy to be applied to the sectionalizing wire 2 SEC at field station No. 2, and thus the relay 2S becomes picked up through back contact 46 of timer 47. This relay when picked up is maintained energized by a stick circuit including back contact 48 of relay 2DS and front contact 49 of relay 2S. The closure of front contacts 31 and 22 of relay 2S now terminates the communication line circuit so that the control office can communicate via carrier communication with station No. 2.

An indication is transmitted from this station by the carrier transmitter 16 to cause the energization of the indicator lamp 2AF to indicate that station No. 2 is ahead of the line fault. Such indication is transmitted in accordance with the closure of front contact 50 of relay 2S and back contact 51 of timer 47. The timer 47 does not become activated because the relay 2LD is maintained picked up at this time. Inasmuch as relay 2LD is maintained picked up, the reverse sectionalizing relay 2RS cannot be picked up because its circuit is open at this time at back contact 52 of relay 2LD.

From the above-described mode of operation, it will be apparent that the communication line circuit has become sectionalized in accordance with the assumed open circuit condition at the point X; that the portion of the communication line circuit ahead of the fault has been terminated and is used for carrier communication between the control office and the intermediate stations; and the portion of the communication line circuit beyond the fault has been properly terminated and connected to the auxiliary line circuit for carrier communication between the control office station and the stations beyond the fault.

Where there is more than one station beyond the line circuit fault, the operator at the control office will proceed to transmit desectionalization controls for different stations involved successively to put the line circuit back together. To consider an example of such operation, it will be considered that the line circuit is broken at the point XX rather than at point X, thus providing that there will be automatic sectionalization both at station No. 2 and station No. 9. Under these conditions, the only way there can be communication between the control office station and the intermediate field station No. 2 is through the auxiliary line circuit when connected by contacts 25 and 28 to the communication line circuit. The mode of operation for sectionalization at the last station No. 9 is rendered effective as has been heretofore described, wherein the line circuit is disconnected at back contact 23 and 30 of relay 9RS.

In order that the line circuit may be extended from the field station No. 9 to the intermediate station No. 2, a desectionalization control must be communicated from the control office station to cause deenergization of the sectionalizing relays 9S and 9RS to remove the line circuit termination at the field station No. 9 and to extend the communication line circuit backwardly toward the control office station to the intermediate station No. 2. This mode of operation is accomplished by the operation of the switch 9MS at the control office station to a desectionalization position for transmitting a desectionalization code from the control office station via the auxiliary line wires 18 and 19 to the last station No. 9. The reception of this control applies energy on the wire 9DES to cause the picking up of desectionalization relay 9DS through resistor 53. The picking up of this relay causes the dropping away of relay 9S by opening its circuit at back contact 38, but the relay 9LDP, which is also normally dependent upon stick energy through back contact 38 is maintained energized by a circuit closed through front contact 38 directly to the winding of relay 9LDP. The dropping away of relay 9S causes the dropping away of relay 9RS by opening its circuit at front contact 42, and thus relay 9LD becomes energized from a battery 54 at the far end of the communication line circuit. More specifically relay 9LD is energized from a positive terminal of battery 54 through a choke winding *55a*, front contact 56 of relay 9LDP, back contact 24 of relay 9S, back contact 23 of relay 9RS, resistor 57, winding of relay 9LD, back contact 30 of relay 9RS, back contact 29 of relay 9S, front contact 58 of relay 9LDP, and a choke winding *55b* to the negative terminal of battery 54.

Under the assumed conditions where there is a break in the line circuit at the pint XX, the sectionalization apparatus has been rendered active at the intermediate station No. 2 by the dropping away of relay 2LD by a mode of operation similar to that which has been described as being effective at station No. 9, and the picking up of relays 2S and 2RS terminates the line circuit at field station No. 2. The carrier transmitter and receiver 16 at field station No. 2 is now connected to the communication line circuit extending beyond the field station and connected to the auxiliary wires 18 and 19 so as to maintain code communication with the control office station carrier transmitter receiver 15. It should be readily apparent from the mode of operation that has been described for extending the line circuit by desectionalization control from one station to another that this mode of operation can be accomplished, irrespective of the number of stations involved.

In case the line circuit is sectionalized at more then one field station between a line circuit fault and the control office station, an operator at the control office station can put the line circuit back together, station by station, as desired, after the sectionalization has been rendered effective, to effectively isolate the area in which the fault has occurred. Such a condition could exist where the failure is caused by the shorting of the communication line wires rather than by an open circuit as has been heretofore considered. An operator at the control office station is advised as to the general area of a fault by watching the sectionalization indicator lamps which are selectively illuminated in case of a line circuit fault to indicate whether the associated station is ahead of the fault or beyond the fault in the line circuit. With this information, the operator can intelligently designate for transmission desectionalization controls to put the various portions of the line circuit back together so as to restore practically all of the field stations to normal operation even though the fault in the line circuit may still exist for sometime until the repair of the condition can be made.

After repair of the line circuit has been made, an operator at the control office station can designate the transmission of desectionalization controls for any stations that remain sectionalized because of the line circuit failure, thus causing the restoration to normal conditions of the sectionalizing means at the associated stations by a mode of operation similar to that which has been described when considering energization of the desectionalization relay 9DS at field station No. 9. An operator can then actuate his manual control switches for stations to which he has transmitted desectionalization controls to cancel positions, which are the normal positions for the manual switches MS, and controls can be transmitted in accordance with these positions to cause the deenergization of the desectionalization relay DS at the corresponding stations.

The relay 9DS, for example, has been maintained energized after having been operated by a control from the control office by a stick circuit including front contact 35 of relay 9LD, diode 59, front contact 60 of relay 9DS, and resistor 53. This stick circuit does not become closed upon desectionalization until after a series of relay operations that have been described to cause the picking up of relay 9LD. An auxiliary stick circuit is provided to cover time for these operations in the form of a normally charged capacitor 61 that is connected across the winding of relay 9DS through resistor 62 and front contact 60 of relay 9DS. Reception of a manually designated cancel control code at station No. 9 energizes cancel wire 9CAN, which shunts the winding of relay 9DS to cause that relay to be dropped away. The dropping away of relay 9DS opens the circuit by which the relay 9LDP has been maintained energized to cause the dropping away of that relay to be rendered effective to complete the restoration to normal conditions of the line circuit control apparatus at the field station No. 9. In a similar manner, a cancellation control, when transmitted to each of the other field stations which has been desectionalized, causes the dropping away of the desectionalization relay DS at that station to restore the normal conditions of the line circuit and sectionalizing system.

Provision is made for indicating the grounding of the line circuit by use of a ground detector and alarm 65 connected to a center tap of the line battery 14 and through a resistor 66 to ground. When a ground is detected by the ground detector and alarm 65, an operator actuates the pushbutton switch 20 to cause all stations to sectionalize as described, followed by desectionalizing in turn all stations until the location of the ground is determined. Again sectionalizing and desectionalizing all except the station immediately ahead of the fault, the operator proceeds as described to desectionalize via the auxiliary route, leaving the grounded area isolated. Of course if the ground occurs as a result of a line wire break or cross, as would normally be the case, the system automatically sectionalizes as has been described.

In the event that a valid control cannot be received at a station as a result of excessive noise due to the unbalance of the circuit with one wire broken and/or grounded beyond that station, operation of the button 20 as described for sectionalizing in case of a ground can be used to properly sectionalize and terminate the line circuit at that station.

While there has been described what is at present considered to be the preferred embodiment of the invention, it will be obvious to those skilled in the art that various changes and modifications can be made therein, without departing from the invention.

I claim:

1. A system for sectionalizing a communication line circuit connecting a control office station and a plurality of successive remotely spaced field stations in a code communication system wherein the communication line circuit is normally energized at a control office station and wherein the improvement comprises;

a. means at each field station for continuously sensing the energization of the communication line circuit, b. sectionalizing means at each field station activated in response to the deenergization of the sensing means for opening the communication line circuit at the associated station, c. desectionalizing means at each station adapted to be activated from the control office to deactivate the sectionalizing means and thereby close the communication line circuit at the associated station, d. carrier code communication means partly at the control office and partly at the several field stations for communicating controls for the desectionalization means from the control office to the several field stations and for communicating indications as to the conditions of the sectionalizing means for the several field stations to the control office, e. an auxiliary line circuit connecting the control office to the most remote station for communication of the control office station with stations beyond a fault in the line circuit when such fault occurs, and f. means for selectively connecting the auxiliary line circuit to the communication line circuit at the most remote station in accordance with the condition of the sensing means at the associated station.

2. The invention according to claim 1 wherein the sectionalizing means includes means for terminating the communication line circuit at each station in response to activation of the associated sectionalizing means.

3. The invention according to claim 2 wherein the sectionalizing means includes means for selectively connecting the terminating means to the portion of the communication line circuit extending in one direction or another from the associated field station in accordance with the condition of the sensing means at the associated station.

4. The invention according to claim 1 wherein indicators are provided at the control office station for the several field stations for indicating whether the associated station is ahead of or beyond a communication line circuit point of failure relative to the control office station and means is provided including the carrier communication system and the sensing means for controlling the indicators.

5. The invention according to claim 1 wherein manual control means including multiple position manual control switches at the control office for the several field stations is provided for selectively activating the sectionalizing and desectionalizing means at the several stations.

6. The invention according to claim 5 wherein the manual control means can also be distinctively activated to transmit cancel controls to the several stations for deactivating the desectionalizing means at the associated station.

7. The invention according to claim 6 wherein means is provided at the control office station for manually opening the line circuit extending to the field stations to thereby cause actuation of the sectionalizing means at all of the stations substantially simultaneously.